United States Patent
Davee

[11] 3,719,419
[45] March 6, 1973

[54] SELECTIVE SINGLE LENS PROJECTING SYSTEM

[76] Inventor: Lawrence W. Davee, c/o Century Projector Corporation, 165 West 46th Street, Tenafly, N.J. 10036

[22] Filed: Dec. 10, 1970

[21] Appl. No.: 96,923

[52] U.S. Cl. .................... 353/101, 350/39, 352/142, 353/97, 355/74
[51] Int. Cl. ........................ G03b 3/00, G03b 21/14
[58] Field of Search ......... 95/44 R, 45; 353/100, 101, 353/76, 97, 75, 71; 350/39, 183, 206, 254; 355/74; 352/142

[56] References Cited

UNITED STATES PATENTS

| | | | |
|---|---|---|---|
| 2,878,718 | 3/1959 | Post | 353/76 |
| 2,937,569 | 5/1960 | Wilton | 353/78 |
| 2,377,954 | 6/1945 | Mellien | 350/254 |
| 3,388,650 | 6/1968 | Westphalen | 95/44 R |
| 3,549,250 | 12/1970 | Pantenburg | 353/97 |
| 2,285,915 | 6/1942 | Dutton | 353/97 |

*Primary Examiner*—Robert B. Hull
*Assistant Examiner*—Steven L. Stephan
*Attorney*—Gustave Miller

[57] ABSTRACT

The projector system includes in combination with the prime focusing lens and film aperture for projecting a picture of desired dimensions through a single removable lens onto a screen, at least one additional single lens having a different curvature for changing the enlargement of the image on the screen, said additional lens being movably mounted for selective use in place of said first single lens when the corresponding image enlargement is desired, therebeing an additional corresponding aperture for use with each of the additional lenses, of suitable format to project a picture on the screen of substantially the same size for each image enlargement. Each additional lens is mounted for proper spacing in front of the prime lens to change the image enlargement correspondingly without requiring any focusing adjustment of the prime lens. The single lenses are mounted on a turret or slide mounting for selective interposition in front of the prime lens, and the mounting is connected to an aperture plate having the different apertures for moving them selectively into operative positions in accordance with the selected lens. This movement may be accomplished manually or automatically by motor means.

3 Claims, 2 Drawing Figures

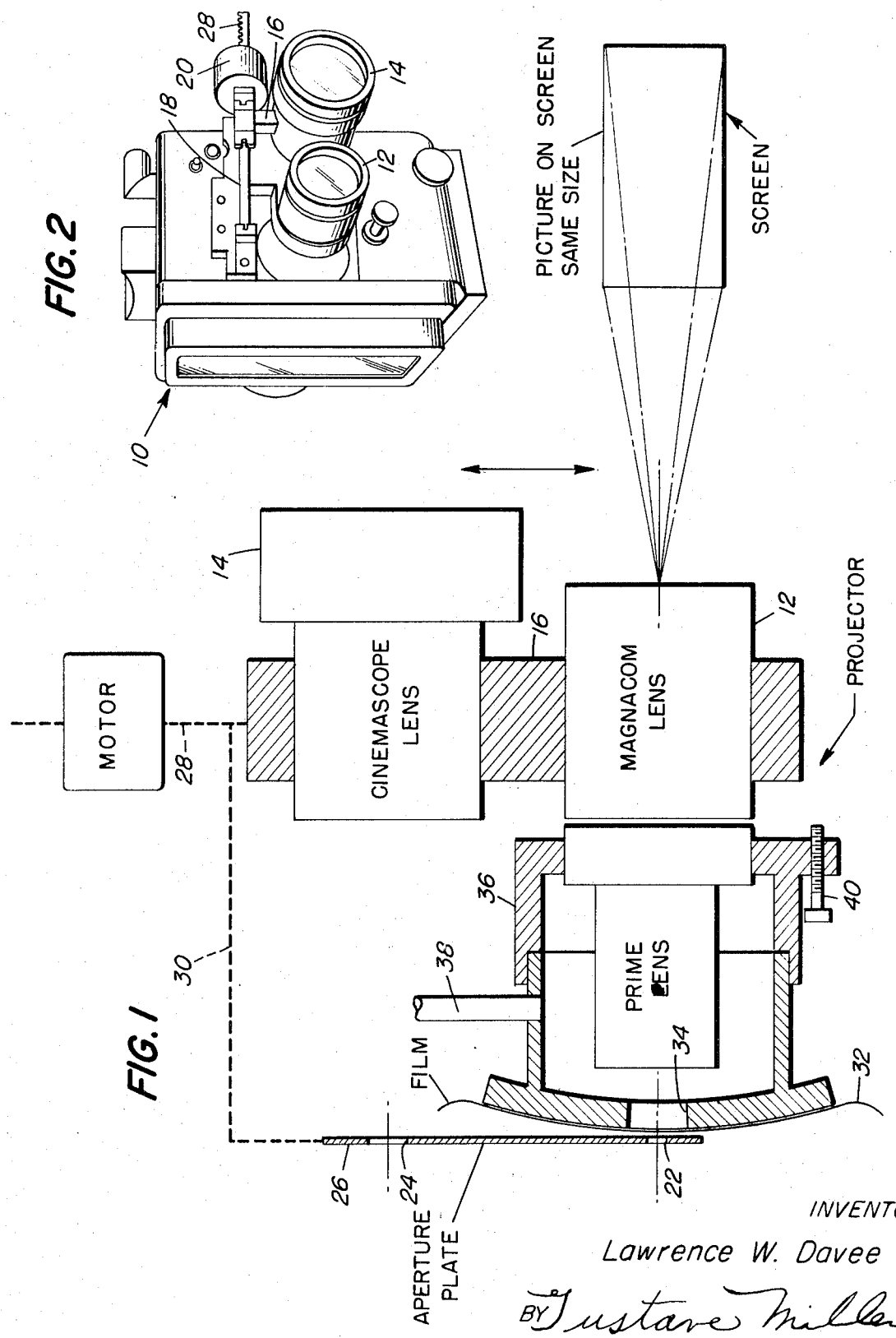

SELECTIVE SINGLE LENS PROJECTING SYSTEM

The form of the invention illustrated comprises a pair of single lenses mounted on a sliding frame for selective positioning of either of the single lenses in front of the prime lens, and a corresponding pair of apertures in an aperture plate which is connected with the sliding frame to place the proper aperture in back of the film, masking it so as to provide substantially the same size framing for the picture on the screen regardless of amount of image enlargement.

OBJECTS OF THE INVENTION

The object of this improved projector system is to obviate the necessity of using expensive duplicate prime lenses for each image enlargement desired, and the necessity of adjusting the focus each time a different enlargement lens system is used, by using the same prime lens for all enlargements, and changing only a single lens with its corresponding spacing in front thereof to provide the image enlargement desired without requiring any focus adjustment, once the prime lens has been properly focussed with any one of the single lenses used.

A further object is to use a plurality of single lenses of different curvatures on a movable mounting for selective insertion of any one of these single lenses in its proper spaced relation in front of the prime lens to provide the corresponding image enlargement.

A further object is to use a different aperture format with each different lens to produce substantially the same same size of picture frame on the screen with any image enlargement.

A further object is to provide a common interconnecting control for simultaneous movement of the selected lens and its corresponding aperture into their respective operative positions.

A further object is to motorize this simultaneous control for automatic operation.

A further object is to provide an improved method of projecting film frames on a screen, requiring only a single lens change properly spaced in front of the prime lens to change the image enlargement on the screen, and a simultaneous corresponding change in the aperture format to retain substantially the same size of picture on the screen, without substantial loss of continuity in the projection of successive film frames.

Other and more specific objects will become apparent in the following detailed description of one form of the invention as illustrated herein.

BRIEF SUMMARY OF INVENTION

It has been the usual practice to use lenses of various focal lengths so that as the aperture size is changed in the projector, the picture size in the theathre remains essentially the same size. The picture height is usually the same even though the picture width may vary.

One type of operation called "Ultravision" maintains the same picture height as well as width by selecting the 'correct' aperture masking plate and then changing the prime lens to obtain the picture size desired. In the case of the Century Projector Corporation's "Cinescope" projector, an anamorphic lens is used to magnify the picture in the horizontal direction only. This lens is now attached to a prime lens of correct focal length to give the required ratio (approximately 2:1) of screen width to height. When other screen formats are used the aperture plates are changed and a new prime lens is substituted as explained above.

Unfortunately, when the prime lens is changed, the complete lens must be removed from the projector and another prime lens substituted. There are now lens mounts on some projectors that have multiple lenses. These include the prime lens with or without Cinemascope attachments. When a prime lens is changed, it is almost impossible to maintain exact focus of the picture on the screen, and it has been the practice to provide separate focus controls for each such lens. This is because of the excessive magnification of the lenses (approximately 400 diameters).

The present invention uses only one prime lens that always stays in focus in a "permanent" lens mount and is never changed. A holder in front of the projector mechanism holds modifying lenses which are selected to modify the picture size so that it will always appear the same regardless of the format selected. In other words, a change from Standard to Wide screen or to Cinemascope formats, can be made by placing the proper modifying lens in front of the projector prime lens. The modifying lenses are selected to magnify, reduce or enlarge in one direction or the other without changing the prime lens.

By using this new lens system, called the single lens concept, it is no longer necessary to focus the lenses for each change of film. Experience has already indicated that by using the Century Cinefocus air pressurized film stabilization, as disclosed in U.S. Pat. No. 3273953, the projector can be operated over long periods without refocusing. One company using this system has removed the focus knobs completely from its projectors.

BRIEF DESCRIPTION OF FIGURES

The accompanying drawing shows two modifying lenses mounted into a lens mount using first one lens and then the other, as may be desired.

FIG. 1 is a more or less diagrammatic illustration of one form of the improved projector system, and FIG. 2 is a perspective view thereof as applied to a Century projector.

DETAILED DESCRIPTION OF INVENTION

In the drawing the Century projector 10, to which this new invention is applied, has the two single lenses 12 and 14 mounted on a supporting bracket 16, which is slidably mounted on a guide bar 18 to move between two positions, for placing either of the lenses 12 or 14 on the prime lens axis, properly spaced in front thereof.

In the present illustration, the lens 12 may be a "Magnacom" lens and lens 14 a Cinemascope lens as indicated in FIG. 1. These lenses are mounted on the supporting bracket 16, which may be moved by means of a rack 28 extending from the bracket and operated by a motor 20. The corresponding apertures 22 and 24 in aperture plate 26, are brought into their operative positions by means of the mechanical connection 30 between the rack 18 and plate 26.

The projector has a film 32 at the back of the gate 34 in the prime lens casing 36, which may be air pressurized for film stabilization for "Cine-focus," as in U.S. Pat. No. 3273953, the air entering through the inlet 38. 40 is the focusing screw for the prime lens. It is seldom needed after the first focusing adjustment with any one of the single lenses in its operative position.

ABSTRACT OF DRAWING

In the drawing, like reference numerals in the two figures refer to like parts for the purposes of explication, and marshalled below are the reference numerals of this improved single lens concept of projector operation:

10 Century model LC-SB projector mechanism to which the illustrated form of this invention is applied
12 single lens of the Magnacom type
14 single lens of the Cinescope type
16 slidably mounted supporting bracket for the lenses
18 guide bar for the slidably mounted bracket
20 motor for automatically noving said bracket
22 aperture for use with the Magnacom lens
24 aperture for use with the Cinescope lens
26 aperture plate
28 rack extension from said bracket
30 mechanical connection for moving the aperture plate simultaneously with said bracket
32 film
34 film gate
36 prime lens casing
38 inlet for pressurized air
40 focusing screw Although this invention has been described in considerable detail, such description is intended as being illustrative rather than limiting, since the invention may be embodied in various specific forms, and the scope of the invention is to be determined as claimed.

What is claimed is:

1. A projector having means for projecting onto a screen at a location fixed with respect thereto enlarged images of film frames having different dimensions, a plate having a plurality of discretely sized apertures dimensioned to conform to the respective film frame dimensions, the plate being movably mounted on the projector for registering an aperture with a similarly dimensioned film frame, prime lens for projecting along an optical path the light passing through an aperture and corresponding film frame, a plurality of objective lens means, each having a different magnifying power, and each being secured on a support movably mounted on the projector for selective movement of one of said objective lens means into the optical path of the prime lens, each of the objective lens means being positioned at such a distance from the prime lens when located in the optical path thereof, that the enlarged image is automatically focused on the screen, and common control means interconnecting the plate and objective lens support for simultaneously moving a selected objective lens means and a corresponding uniquely dimensioned aperture into said path so that the enlarged image projected on the screen as the combination of objective lens means and uniquely dimensioned aperture are changed has at least one constant dimension.

2. A projector according to claim 1 in which the at least one dimension is the height.

3. A projector according to claim 1 wherein the common control means includes motive means and means for energizing the motive means to operate the common control means.

* * * * *

UNITED STATES PATENT OFFICE
CERTIFICATE OF CORRECTION

Patent No. 3,719,419     Dated March 6, 1973

Inventor(s) Lawrence W. Davee

It is certified that error appears in the above-identified patent and that said Letters Patent are hereby corrected as shown below:

On the cover sheet [76] "Tenafly, N. J. 10036" should read -- New York, N. Y. 10036 --.

Signed and sealed this 24th day of April 1973.

(SEAL)
Attest:

EDWARD M. FLETCHER, JR.            ROBERT GOTTSCHALK
Attesting Officer                   Commissioner of Patents